Feb. 26, 1957 W. G. SPIES 2,782,707
FRANKFURTER COOKING AND FILLING APPARATUS
Filed Aug. 8, 1955 2 Sheets-Sheet 2
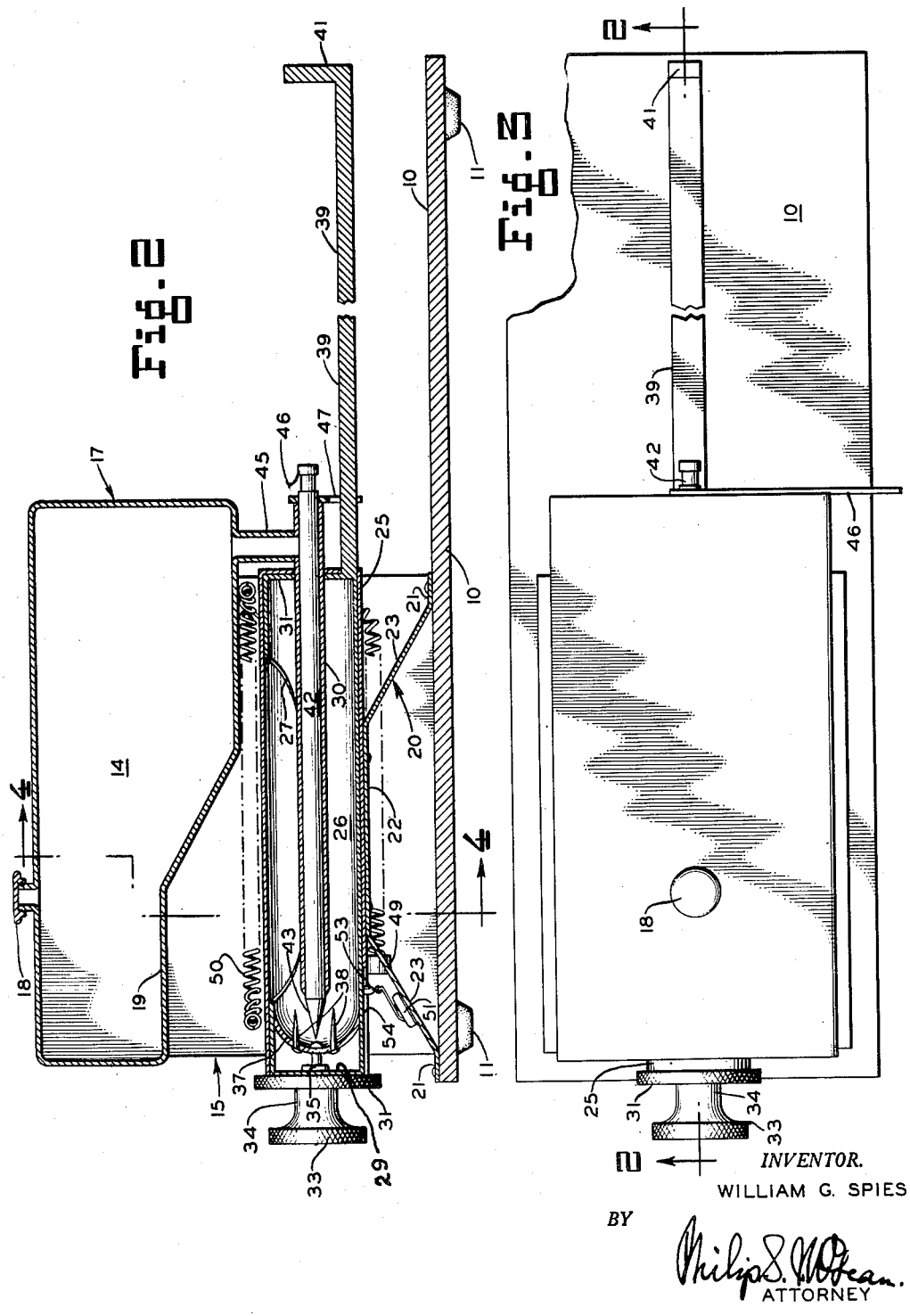
INVENTOR.
WILLIAM G. SPIES
BY
ATTORNEY

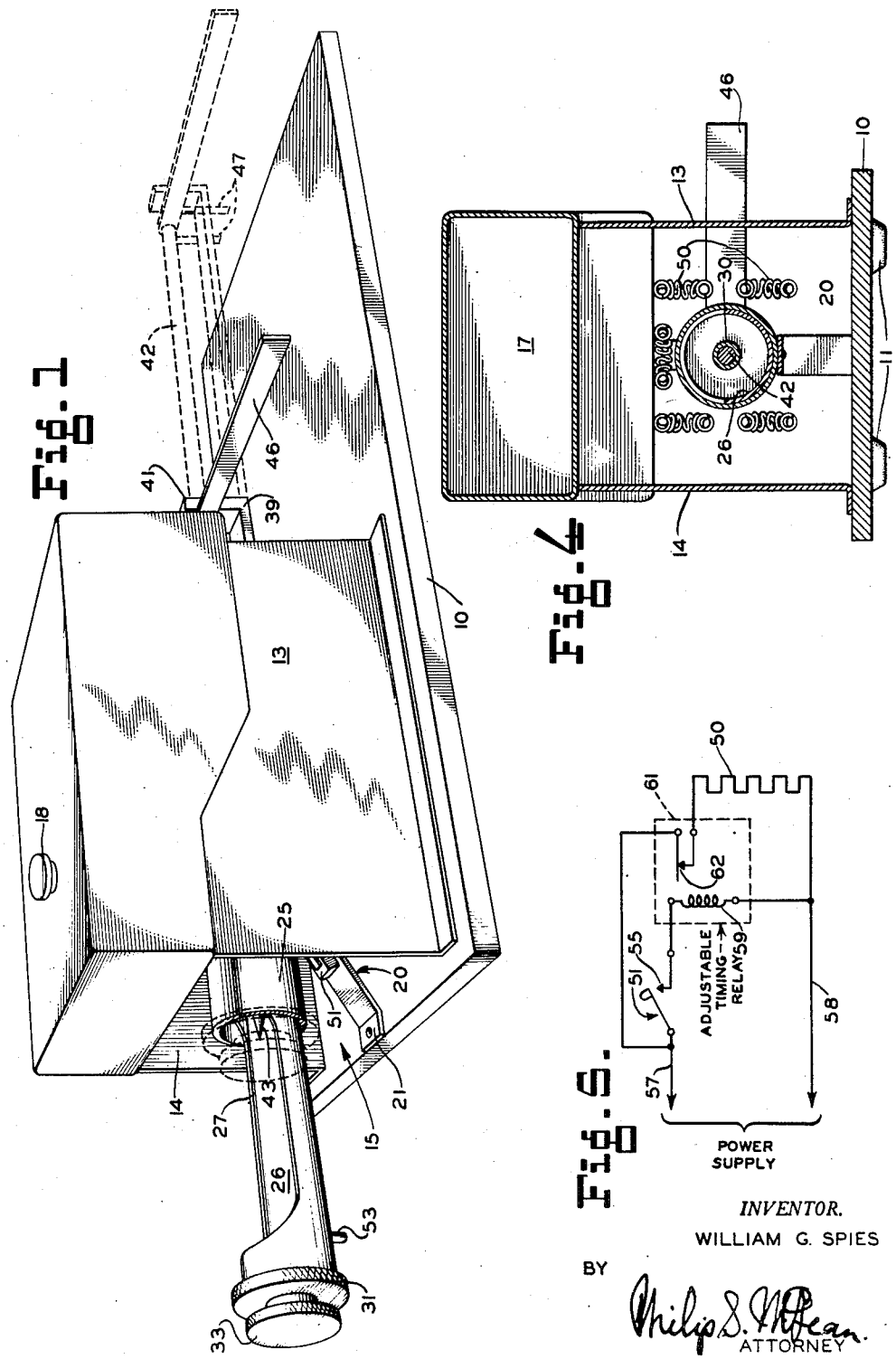

United States Patent Office 2,782,707
Patented Feb. 26, 1957

2,782,707

FRANKFURTER COOKING AND FILLING APPARATUS

William G. Spies, Bloomfield, N. J., assignor of one-half to Eric Pusinelli, New York, N. Y.

Application August 8, 1955, Serial No. 526,909

6 Claims. (Cl. 99—355)

The present invention relates to apparatus for the cooking of sausages such as frankfurters, for example, and more particularly to apparatus of this character wherein a condiment is injected into the sausage immediately prior to its withdrawal from the cooking apparatus.

Basically, the invention comprises infra-red heating means, a movable container for the sausage to be cooked, and an axially disposed infra-red reflective injector tube member which serves both to introduce a fluid condiment into the sausage and to cause radially omnidirectional penetration of the sausage by the infra-red rays during the course of its cooking.

An object of the invention is the provision of cooking apparatus of this character which is adapted to receive an unheated elongated sausage and to deliver the sausage deliciously cooked together with a flavorful internally longitudinally extending condimental core.

A further object of the invention is the provision of apparatus of this character wherein the withdrawal means for the cooked sausage cooperates with the condiment injecting means to produce an axially injected toothsome core which is disposed within the finished sausage substantially simultaneously with the completion of the cooking operation.

Still another object of the invention is the provision of combined cooking and condiment injection apparatus of simple construction which may be easily cleaned and which is economical to manufacture.

Other and further objects, advantages and features of the invention will become apparent upon reading the following specification together with the accompanying drawings forming a part hereof.

Referring to the drawings:

Figure 1 is a perspective view of cooking apparatus embodying the invention, with the cooking receptacle in its open position.

Figure 2 is a longitudinal sectional view in elevation taken along the line 2—2 of Figure 3, looking in the direction of the arrows, with the cooking receptacle closed.

Figure 3 is a plan view with the cooking receptacle closed.

Figure 4 is a transverse sectional view in elevation taken along the line 4—4 of Figure 2, looking in the direction of the arrows.

Figure 5 is an electrical circuit diagram showing connections for energizing and controlling the infra-red heating elements.

Referring to Figure 1, the cooking apparatus is mounted upon a flat rectangular base or platform 10 which is supported by feet 11. Suitably secured to the upper surface of base 10 are upstanding side walls 13 and 14 which in part define an open ended heating chamber designated generally as 15. The top of the heating chamber 15 is closed by a condiment reservoir designated generally as 17. The reservoir 17 is provided with a removable screw cap 18 for refilling the reservoir whenever required. The condiment reservoir 17 is supported by the upper end portions of side walls 13 and 14 and the bottom wall 19 serves as a closure for the top of the open ended heating chamber 15.

A supporting bracket designated generally as 20 is provided with feet 21 secured to the upper surface of base 10. The bracket 20 comprises an elongated central portion 22 which extends above base 10 between integrally formed inwardly and upwardly convergent straight leg portions 23, the lower ends of leg portions 23 terminating in the feet 21.

A tubular housing 25 extends longitudinally through the heating chamber 15 and is secured at its under surface to the central portion 22 of bracket 20 thus being fixedly positioned within the heating chamber 15.

Longitudinally slidably and non-rotatably disposed in the tubular housing 25 is a cylindrical cooking receptacle 26. The upper half of the receptacle 26 is cut away at 27 so that it is of generally semicylindrical cross section intermediate its ends to permit the convenient insertion therein or removal therefrom of a frankfurter or similarly sausage-shaped elongated edible with rounded ends which is to be cooked by the apparatus.

The front of receptacle 26 is closed by an integrally formed end wall 29. A condiment injection tube 30 extends coaxially within the receptacle 26 passing in a slidable and fluid-tight manner through a rear end wall portion 31 of the receptacle 26. A peripherally knurled disc shaped handle member 31 is fixed to the front of the receptacle 26 and may be used for pulling the receptacle 26 forwardly in the tubular housing 25 for access to its contents through the cut away portion 27.

A knurled knob 33 is provided with a forwardly extending shank 34 which is freely rotatable in the front end wall 29 of receptacle 26 and the disc-shaped handle member 31. Longitudinal movement of shank 34 with respect to receptacle 26 is prevented by a collar 35 fixed on the shank 34. A hemispherically shaped cup member 37 is freely rotatably disposed within the receptacle 26 immediately forwardly of the cut away portion 27. The edges of cup member 37 are in close proximity to the inner lateral surface of receptacle 26, the rounded end of cup member 37 being fixedly secured to the inner end of shank 34 for rotation therewith. On its inner surface, the cup member 37 is provided with a plurality of symmetrically arranged rearwardly directed spike members 38. The spike members 38 are adapted to engage in forward end of a frankfurter disposed in receptacle 26 whereby the frankfurter may be turned by manual rotation of knurled knob 33.

Fixed to the rear end of receptacle 26 is an elongated rearwardly extending arm 39 which terminates in an upright projection 41. Slidably disposed in the condiment injection tube 30 is an injection plunger 42. The forward end of injection plunger 42 terminates in a sharp point 42 for piercing a frankfurter longitudinally so that it may easily slide over and around the injection tube 30 as the receptacle 26 with the frankfurter therein is pushed forwardly prior to cooking.

A condiment delivery duct 45 extends downwardly from the bottom of reservoir 17 and its lower end communicates with the rear end of the injection tube 30. When the pointed injection plunger 42 is in its forward position, as shown in Figure 2, the delivery duct 45 is shut off. When the injection plunger 42 is withdrawn rearwardly, as indicated by dotted lines in Figure 1, the duct 45 is open and the fluid condiment contained in reservoir 17 may flow downwardly into injection tube 30. If tube 30 is closed by the frankfurther so as to be relatively airtight, the withdrawal of plunger 42 will crease a partial vacuum which will draw the condiment downwardly into the injection tube 30, otherwise the condiment may flow into the tube 30 by gravity alone.

A horizontally extending handle 46 is fixed to the rear end of plunger 42 for producing longitudinal movement thereof in the injection tube 30. The handle 46 comprises laterally spaced downwardly extending guide legs 47 which laterally straddle the arm 39 and maintain handle 46 in a horizontal position.

A plurality of ceramic insulating bushings 49, of which one is shown in Figure 2, support a series of heating units 50 formed of helically coiled resistance wire. The heating units 50 are disposed within the open ended heating chamber 15 and surround the tubular housing 25 so that it is generally heated by infra-red radiation in a uniform manner when the heating units 50 are energized.

Advantageously, the receptacle 26 and the tubular housing 25 are formed of material which transmits the infra-red radiations freely to the frankfurter in the receptacle 26. The injection tube 30 is preferably polished and formed of material which will reflect the infra-red radiations of the heating units 50 so that after they traverse the frankfurter radially inwardly, they will be reflected radially outwardly, thereby providing an increased uniformity of distribution of cooking heat.

A control switch 51 is mounted on one of the sloping legs 23 of bracket 20. A downwardly extending pin 53 is fixed to the underside of receptacle 26 near its forward end. The tubular housing 25 has a forwardly opening slot formed therein near its forward end in which the pin 53 may be received. When the receptacle 26 is fully inserted in the tubular housing 25, the lower end of pin 53 engages the switch 51, causing it to close its contacts 55 (Figure 5).

Referring to Figure 5, power for operation of the apparatus is supplied by power conductors 57 and 58. Power conductor 57 extends through the contacts 55 of control switch 51 to the operating winding 59 of an adjustable time delay relay 61, the circuit being completed directly to the other power supply conductor 58. Immediately upon closure of switch contacts 55, relay contacts 62 of time delay relay 61 close energizing the heater units 50 from power conductors 57 and 58. This starts the cooking operation. After an adjustably predetermined interval, the contacts 62 of time delay relay open to deenergize the heater units 50 at the termination of the cooking interval. The time delay relay 61 may be of any desired type such as a thermally actuated, motor driven, clockwork escapement, dashpot controlled, or condenser charge or discharge type, all of which are well known in the art.

In operation, the cooking receptacle 26 is drawn forwardly and a frankfurter is inserted therein through the cut away portion 27, the forward end of the frankfurter being impaled upon the spikes 38, with the frankfurter positioned therein and with the plunger 42 held in its forward position by grasping the laterally projecting handle 46. This causes the sharp point 43 of plunger 42 to pierce the frankfurter longitudinally so that it slides easily over the injection tube 30. When the receptacle 26 is pressed home within the tubular housing 25, pin 53 engages and closes control switch 51, starting the cooking cycle. As the cooking proceeds, the knob 33 is turned to rotate the frankfurter so that it is evenly cooked. At an appropriate time during the cooking period, the handle 46 of plunger 42 is pressed rearwardly, withdrawing the plunger 42 from injection tube 30.

If the fluid condiment is of such a type that it is desirable to cook the condiment along with the frankfurter, then the plunger 42 is withdrawn early in the cooking cycle. Alternatively, it may be withdrawn after the cooking of the frankfurter is completed or nearly completed. When the cooking has been completed the power is shut off by time delay relay 61. The receptacle 26 is then drawn forwardly for access to the cooked frankfurter so that it may be served.

As the receptacle 26 is drawn forwardly, the upright projection 41 at the rear end of arm 39 engages the rear end of plunger 42 so that receptacle 26 and the plunger 42 move forwardly as a unit. The liquid condiment in injection tube 30 is thus pressed into the frankfurter at the same rate that the longitudinal channel previously occupied by injection tube 30 becomes vacant, thus inserting the condiment in the frankfurter as a continuous centrally disposed core. The delivery duct 45 is shut off as the plunger 42 commences its forward movement so that there will be no excess of condiment injected in the frankfurter and the condiment will be retained within the frankfurter.

While I have shown what I believe to be the best embodiments of my invention, it will be apparent to those skilled in the art that many changes and modifications may be made therein without departing from the spirit and scope of the invention as defined in the appended claims.

Instead of relying on gravity or atmospheric pressure to feed the condiment, positive pressure may be supplied as by means of a spring actuated piston, or the like, or compressed air or gas pressure. Also, it is contemplated that the cooking heat may be applied by other than infra-red heating means, such as by carbon or the like, and that the central member may be perforated to admit the food penetrating rays, instead of reflecting them, thus to create a pattern or checkered cooking result on the food material.

What is claimed is:

1. Cooking apparatus of the class described, comprising in combination means defining a cooking chamber, a cooking receptacle adapted to receive an elongated edible slidably disposed in said chamber to be withdrawn therefrom, a tubular member open at one end and fixedly disposed in said cooking chamber, said open end slidably extending into an edible in said receptacle when said receptacle is positioned in said chamber, a plunger member slidable in said tubular member, a supply reservoir for a liquid to be injected in said edible and duct means connecting said supply reservoir to an end portion of said tubular member spaced from said open end, said duct means being shut off by said plunger member when said plunger member is inserted in said tubular member and open for communication with said tubular member when said plunger member is at least partially withdrawn from said tubular member.

2. Apparatus according to claim 1, further comprising means carried by said receptacle and engageable with said plunger member for forcing said plunger member into said tubular member when said receptacle is withdrawn from said cooking chamber.

3. Cooking apparatus of the class described, comprising in combination means defining a controllably heated cooking chamber, an elongated cooking receptacle closed at both ends and longitudinally slidably disposed in said cooking chamber to be at least partially removed therefrom at will, said receptacle being adapted to receive therein an elongated edible to be cooked, a fixed injection tube member open at one end and extending slidably through a closed end portion of said receptacle and extending longitudinally centrally of said edible with said open end disposed in said edible when said receptacle is positioned in said chamber, a plunger member slidably disposed in said tube member, a supply reservoir for a liquid to be injected in said edible and duct means connecting said supply reservoir to an end portion of said tube member spaced from said open end, said duct means being shut off by said plunger member when said plunger member is inserted in said tube member and open for communication with said tubular member when said plunger member is at least partially withdrawn from said tubular member.

4. Apparatus according to claim 3 wherein said plunger member is provided with a pointed end which projects beyond said tube member through said open end when said plunger member is fully inserted therein, said pointed end being adapted to pierce said edible to facilitate the insertion of said tube member therein.

5. Apparatus according to claim 3 in which said reservoir is disposed in close proximity to said cooking chamber to be heated thereby for maintaining the contents of said reservoir in a fluid state.

6. Apparatus according to claim 3, further comprising means carried by said receptacle and engageable with said plunger member for forcing said plunger member into said tubular member when said receptacle is withdrawn from said cooking chamber.

References Cited in the file of this patent

UNITED STATES PATENTS

| | | |
|---|---|---|
| 1,719,931 | Hall | July 9, 1929 |
| 1,910,682 | Dumas | May 23, 1933 |
| 2,005,395 | Rothfeld | June 18, 1935 |
| 2,019,170 | Barlow | Oct. 29, 1935 |
| 2,208,651 | Wallace | July 23, 1940 |
| 2,286,394 | Togut | June 16, 1942 |
| 2,506,931 | Lopes | May 9, 1950 |
| 2,634,749 | Cone | Apr. 14, 1953 |
| 2,674,958 | Puls | Apr. 13, 1954 |